US012644996B2

(12) United States Patent
Yamazaki et al.

(10) Patent No.: US 12,644,996 B2
(45) Date of Patent: Jun. 2, 2026

(54) POSITIONING TERMINAL, INFORMATION PROCESSING DEVICE, AND POSITIONING METHOD

(71) Applicant: Panasonic Intellectual Property Management Co., Ltd., Osaka (JP)

(72) Inventors: Yasuhisa Yamazaki, Kanagawa (JP); Naoto Horiike, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 285 days.

(21) Appl. No.: 18/277,450

(22) PCT Filed: Jan. 25, 2022

(86) PCT No.: PCT/JP2022/002568
§ 371 (c)(1),
(2) Date: Aug. 16, 2023

(87) PCT Pub. No.: WO2022/176524
PCT Pub. Date: Aug. 25, 2022

(65) Prior Publication Data
US 2024/0125945 A1 Apr. 18, 2024

(30) Foreign Application Priority Data

Feb. 22, 2021 (JP) ................................. 2021-026241

(51) Int. Cl.
*G01S 19/45* (2010.01)
*G01S 19/20* (2010.01)
(52) U.S. Cl.
CPC .............. *G01S 19/45* (2013.01); *G01S 19/20* (2013.01)

(58) Field of Classification Search
None
See application file for complete search history.

(56) References Cited

U.S. PATENT DOCUMENTS

2008/0082265 A1 4/2008 Chen et al.
2012/0327922 A1 12/2012 Takahashi et al.
(Continued)

FOREIGN PATENT DOCUMENTS

JP 08-334335 12/1996
JP 2008-070348 3/2008
(Continued)

OTHER PUBLICATIONS

Extended European Search Report issued in European Patent Application No. 22755848.3, dated Aug. 7, 2024.
(Continued)

*Primary Examiner* — Resha Desai
*Assistant Examiner* — Brandon James Henson
(74) *Attorney, Agent, or Firm* — Greenblum & Bernstein, P.L.C.

(57) ABSTRACT

A positioning terminal includes: a reception unit which receives a first signal from a satellite and a second signal from a signal generator installed in a structure; and a control unit which, on the basis of a comparison result between a distance between a first positioning result acquired from the first signal and a second positioning result acquired from the second signal and the positioning accuracy of the second positioning result, outputs either the first positioning result or the second positioning result.

11 Claims, 9 Drawing Sheets

(56)         References Cited

U.S. PATENT DOCUMENTS

| 2014/0003542 | A1* | 1/2014 | Zukerman | ............. | H04J 3/0641 |
| | | | | | 375/259 |
| 2019/0094377 | A1* | 3/2019 | Pon | ......................... | G01S 19/30 |
| 2023/0115602 | A1* | 4/2023 | Vollbracht | .............. | G01S 15/52 |
| | | | | | 342/357.28 |

FOREIGN PATENT DOCUMENTS

| JP | 2014-153193 | 8/2014 |
| JP | 2016-024064 | 2/2016 |
| JP | 2019-132627 | 8/2019 |

OTHER PUBLICATIONS

International Search Report issued in International Patent Application No. PCT/JP2022/002568, dated Mar. 29, 2022, along with an English translation thereof.

* cited by examiner $$eDR = a \cdot tDR$$

a: Amount of error per unit time in DR positioning
tDR: Time from time t0 at which DR positioning is started to the present time t1
eDR: DR cumulative error from time t0 to time t1

START

S41

Receive indoor signal from signal generator

S42

Calculate indoor positioning solution based on indoor signal

S43

Configure indoor positioning solution to be indoor positioning result

S44

Store indoor positioning result

END

POSITIONING TERMINAL, INFORMATION PROCESSING DEVICE, AND POSITIONING METHOD

TECHNICAL FIELD

The present disclosure relates to a positioning terminal, an information processor, and a positioning method.

BACKGROUND ART

Patent Literature (hereinafter, referred to as "PTL") 1 discloses a position detection system for seamlessly positioning a moving object at the border between indoor and outdoor areas based on positioning using a positioning signal from a satellite and positioning using a beacon signal from a signal generator installed outdoors and indoors.

Even in a case where a positioning result by a positioning signal from a satellite is obtained, when a positioning result by a beacon signal is obtained, the moving object in PTL 1 prioritizes the positioning result by the beacon signal over the positioning result by the positioning signal from the satellite. This takes into account the characteristic that the positioning result by the beacon signal is unlikely to be distorted compared to the positioning result by the positioning signal from the satellite at the border between indoor and outdoor areas, for example, the entrance of a building, etc.

Note that the positioning accuracy of the positioning result by the positioning signal from the satellite is, for example, on the order of a few centimeters. The positioning accuracy of the positioning result by the beacon signal is, for example, on the order of a few meters. Thus, the positioning accuracy of the positioning result by the positioning signal from the satellite is generally higher than that of the positioning result by the beacon signal.

CITATION LIST

Patent Literature

PTL 1
Japanese Patent Application Laid-Open No. 2019-132627

SUMMARY OF INVENTION

As described above, the moving object in PTL 1 prioritizes the positioning result by the beacon signal at the border between indoor and outdoor areas even when the positioning result by the positioning signal from the satellite is obtained. This causes the positioning result by the beacon signal to be prioritized even when the positioning signal is appropriately received from the satellite in PTL 1, resulting in a decrease in the positioning accuracy of the moving object.

One non-limiting and exemplary embodiment facilitates providing a positioning terminal and an information processor each capable of preventing a decrease in the positioning accuracy at the border between indoor and outdoor areas.

A positioning terminal according to an embodiment of the present disclosure includes: a receiver, which in operation, receives a first signal from a satellite and a second signal from a signal generator installed in a structure; and a controller, which in operation, outputs either a first positioning result resulting from the first signal or a second positioning result resulting from the second signal based on a result of comparing a distance between the first positioning result and the second positioning result with positioning accuracy of the second positioning result.

A positioning method according to an embodiment of the present disclosure includes: receiving a first signal from a satellite and a second signal from a signal generator installed in a structure; and outputting either a first positioning result resulting from the first signal or a second positioning result resulting from the second signal based on a result of comparing a distance between the first positioning result and the second positioning result with positioning accuracy of the second positioning result.

An information processor according to an embodiment of the present disclosure includes: a receiver, which in operation, receives a first signal and a second signal from a terminal receiving the first signal from a satellite and the second signal from a signal generator installed in a structure; and a transmitter, which in operation, transmits, to the terminal, either a first positioning result resulting from the first signal or a second positioning result resulting from the second signal based on a result of comparing a distance between the first positioning result and the second positioning result with positioning accuracy of the second positioning result.

A positioning method according to an embodiment of the present disclosure includes: receiving a first signal and a second signal from a terminal receiving the first signal from a satellite and the second signal from a signal generator installed in a structure; and transmitting, to the terminal, either a first positioning result resulting from the first signal or a second positioning result resulting from the second signal based on a result of comparing a distance between the first positioning result and the second positioning result with positioning accuracy of the second positioning result.

It should be noted that general or specific embodiments may be implemented as a system, an apparatus, a method, an integrated circuit, a computer program, a storage medium, or any selective combination thereof.

According to an exemplary embodiment of the present disclosure, it is possible to prevent a decrease in the positioning accuracy at the border between indoor and outdoor areas.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings as appropriate. For example, a detailed description of an already well-known matter and a duplicate description for a substantially identical configuration may be omitted. This is to avoid unnecessary redundancy of the following description and to facilitate understanding by the person skilled in the art.

Note that, the accompanying drawings and the following description are provided for the person skilled in the art to sufficiently understand the present disclosure, and are not intended to limit the subject matter described in the claims.

Figure 1:
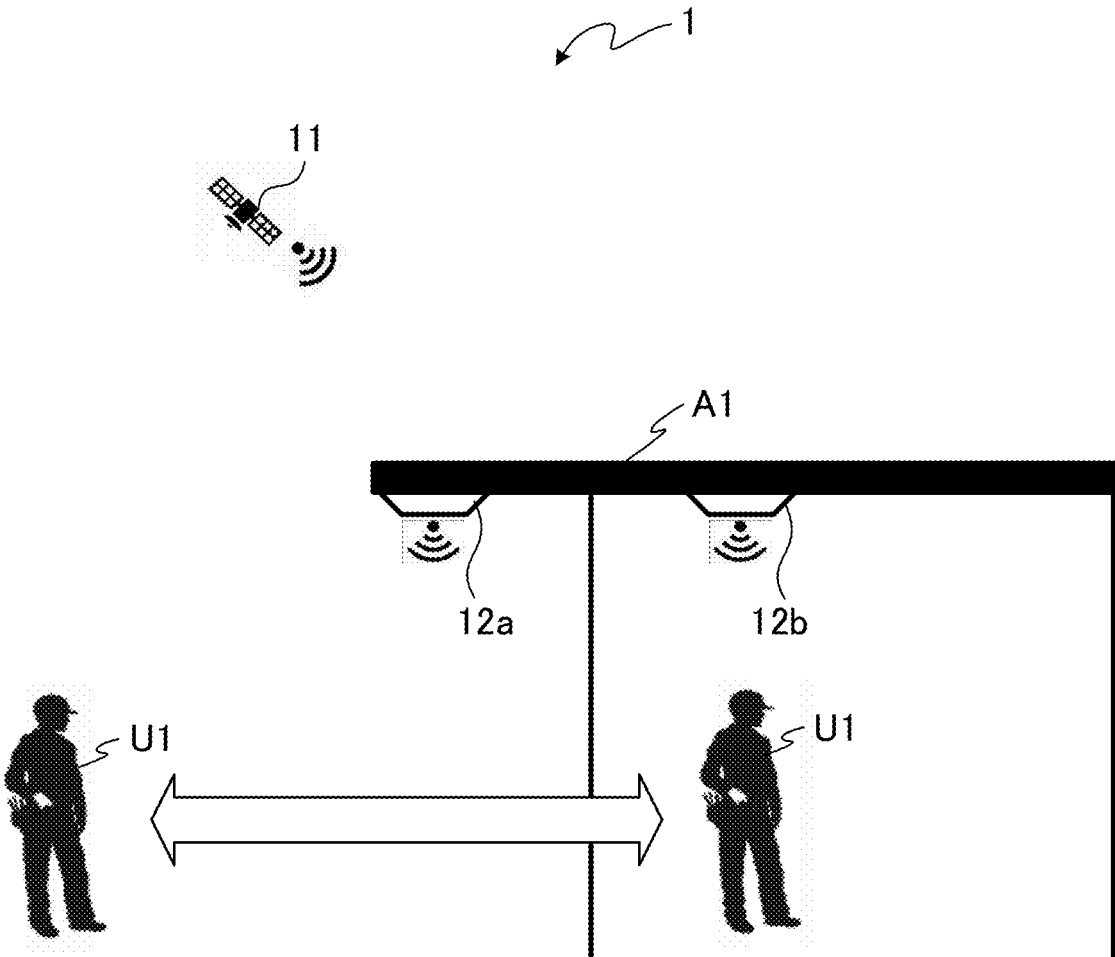
FIG. 1 illustrates an exemplary positioning system according to an embodiment.

FIG. 1 illustrates an exemplary positioning system 1 according to an embodiment. Positioning system 1 includes satellite 11, signal generators 12*a* and 12*b*, and a positioning terminal (not illustrated). Besides positioning system 1, FIG. 1 illustrates building A1 and user U1. The positioning terminal is worn or carried by user U1. User U1, for example, moves between the outside and inside of building A1.

Satellite 11 is, for example, a satellite in the global navigation satellite system (GNSS).

Signal generator 12*a* is installed at the border between the outside and inside of building A1. For example, signal generator 12*a* may be installed in the eaves of building A1. That is, signal generator 12*a* is installed in a position that allows the positioning terminal to receive a positioning signal from satellite 11 and an indoor signal from signal generator 12*a*. In other words, an area is formed at the border between the outside and inside of building A1 where the positioning terminal can receive a positioning signal from satellite 11 and an indoor signal from signal generator 12*a*.

Signal generator 12*b* is installed inside building A1. For example, signal generator 12*b* may be installed on the ceiling of building A1. Signal generator 12*a* and signal generator 12*b* transmit indoor signals of the same scheme or standard by radio.

The positioning terminal measures the position of the positioning terminal by using the positioning signal transmitted from satellite 11 by radio. For example, the positioning terminal measures the position of the positioning terminal by using a real time kinematic (RTK) method.

In addition, the positioning terminal measures the position of the positioning terminal by using a dead reckoning (DR) method. For example, when a FIX solution is no longer obtained by the RTK method, the positioning terminal measures the position of the positioning terminal by using a FIX solution obtained most recently and a sensor signal from a sensor such as an acceleration sensor or a gyro sensor.

Further, the positioning terminal measures the position of the positioning terminal by using the indoor signals transmitted from signal generators 12*a* and 12*b* by radio.

Note that signal generators 12*a* and 12*b* installed in building A1 may be, for example, WiFi (registered trademark) devices, BLE (registered trademark) devices, WiGig (registered trademark) devices, or indoor messaging system (IMES) devices. That is, signal generators 12*a* and 12*b* may transmit indoor signals by radio based on, for example, the WiFi standard, BLE standard, WiGig standard, or IMES.

Hereinafter, the positioning using the RTK method is sometimes referred to as RTK positioning. The positioning using the DR method is sometimes referred to as DR positioning. The positioning using indoor signals transmitted by radio from signal generators 12*a* and 12*b* is sometimes referred to as indoor positioning.

Exemplary features of the RTK positioning, DR positioning, and indoor positioning will be described. In the RTK positioning, a plausible candidate among Float solutions, which are position candidates, is determined as a FIX solution. Since the plausibility is evaluated using signals from a plurality of satellites, in an environment where the signals from the satellites are blocked or reflected, no Float solutions have plausibility exceeding a predetermined criterion value even in outdoors, and the FIX solution cannot be identified accordingly. Thus, a positioning result is likely to be a Float solution in the vicinity of building A1 outside due to, for example, blockage by a wall of building A1 or the like. In some cases, a FIX solution can be obtained even in such an environment depending on the surrounding environment and the positions of the satellites. The FIX solution obtained in this case, however, is a result of misidentifying a signal reflected off a wall or the like as a signal transmitted directly from the satellite, and may be incorrect (such an incorrect FIX solution is referred to as a "false FIX solution").

The positioning accuracy of a FIX solution is, for example, on the order of a few centimeters. Since there may be a plurality of Float solutions as described above, a single positioning result cannot be determined from the Float solutions, but it is possible to output a value indicating a less accurate position by outputting the most plausible Float solution or outputting the mean value of the plurality of Float solutions. In this specification, a temporary position outputted in this manner is also referred to as a "Float solution" unless otherwise distinguished. The positioning accuracy of this Float solution is, for example, on the order of a few meters, although depending on the surrounding conditions of building A1.

In the DR positioning, the position of a positioning terminal is measured (estimated) using a sensor signal with the position of the most recent FIX solution as a reference. The accuracy of the positioning result by the DR positioning deteriorates over time due to accumulated measurement errors by a sensor, for example.

The indoor positioning includes a scheme based on the WiFi standard, BLE standard, WiGig standard, or IMES. The positioning accuracy of the indoor positioning varies for each scheme, but is generally on the order of a few meters.

Figure 2:
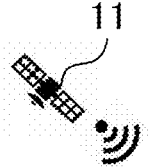
FIG. 2 is a diagram describing exemplary areas where positioning results of RTK positioning, DR positioning, and indoor positioning are obtained.
Figure 2:
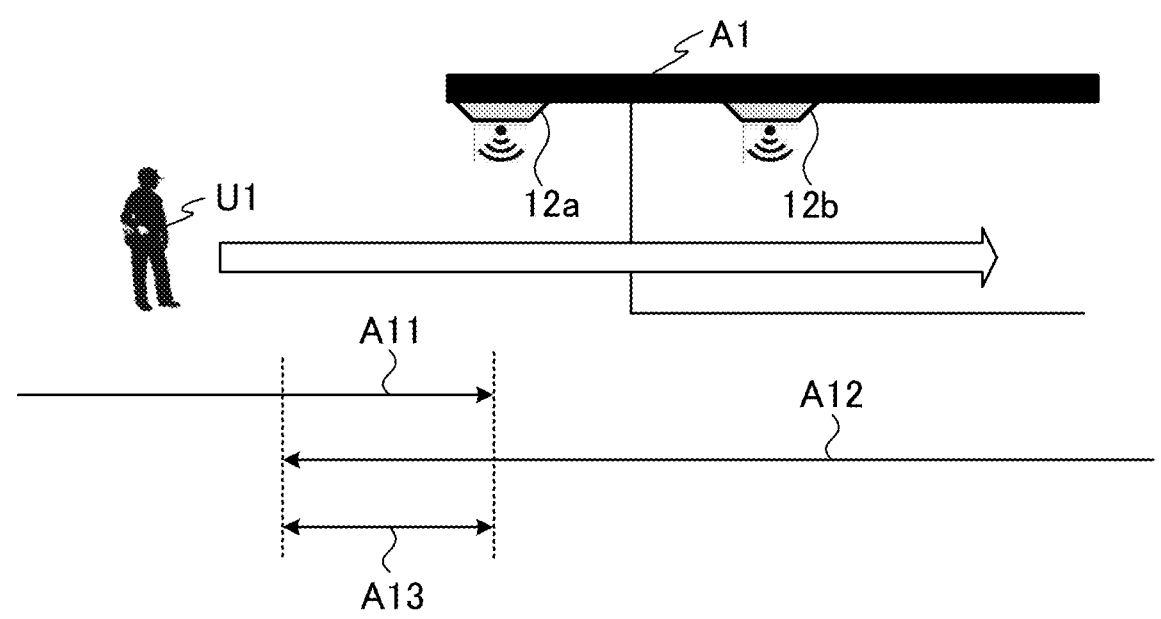

FIG. 2 is a diagram describing exemplary areas where positioning results of the RTK positioning, DR positioning, and indoor positioning are obtained. Note that the areas illustrated in FIG. 2 are not predetermined areas but exemplary schematic areas for explaining an environment assumed in the present embodiment, and it is very difficult to identify the areas in an actual environment. In FIG. 2, the same components as those in FIG. 1 are denoted by the same reference signs. In FIG. 2, user U1 moves from the outside to the inside of building A1. That is, the positioning terminal moves from the outside to the inside of building A1.

Area A11 indicated by the rightward arrow in FIG. 2 represents the area where the positioning terminal can obtain a FIX solution from a positioning signal of satellite 11. Hereinafter, the FIX solution obtained from the positioning signal of satellite 11 is sometimes referred to as an RTK positioning result.

Area A12 indicated by the leftward arrow in FIG. 2 represents the area where the positioning terminal can obtain a positioning result from the indoor signals of signal generators 12a and 12b. Hereinafter, the positioning result obtained from the indoor signals of signal generators 12a and 12b is sometimes referred to as an indoor positioning result.

In area A13 indicated by the double-headed arrow in FIG. 2 where area A11 and area A12 overlap with each other, the positioning terminal can obtain two positioning results of the RTK positioning result and the indoor positioning result. In other words, the positioning terminal can receive the positioning signal from satellite 11 and the indoor signals from signal generators 12a and 12b in area A13. The positioning terminal adopts (outputs) the RTK positioning result or the indoor positioning result, whichever is estimated to have higher positioning accuracy, according to the methods described below.

When the RTK positioning result (FIX solution) is no longer obtained, the positioning terminal calculates the positioning result based on the DR positioning from the most recently adopted RTK positioning result and a sensor signal. For example, the positioning terminal calculates the positioning result based on the DR positioning when it can no longer obtain the RTK positioning result after exceeding area A11 (or area A13) where the RTK positioning result can be obtained.

Thus, the positioning terminal can obtain two positioning results of a positioning result based on the DR positioning and an indoor positioning result when exceeding area A11 (or area A13) where the RTK positioning result can be obtained.

The positioning terminal adopts the positioning result based on the DR positioning or the indoor positioning result, whichever is estimated to have higher positioning accuracy, according to the methods described below. Hereinafter, positioning result obtained by the DR positioning is sometimes referred to as a DR positioning result.

Figure 3:
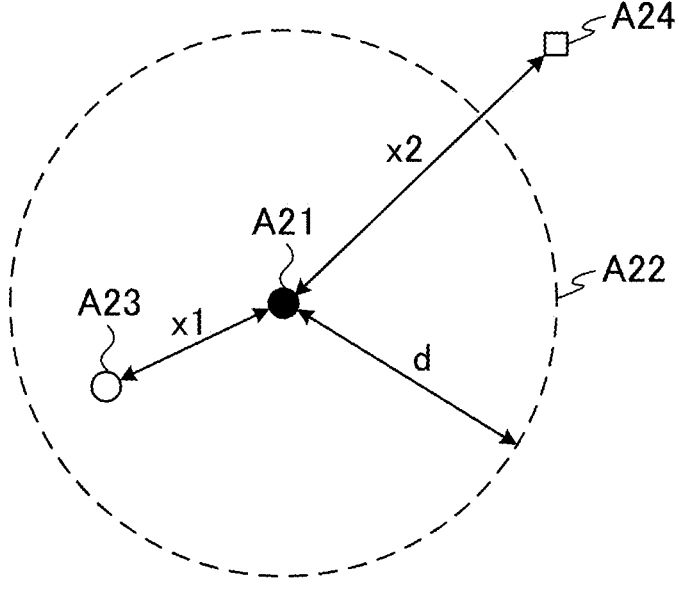
FIG. 3 illustrates an exemplary adopting method for an RTK positioning result and an indoor positioning result.

FIG. 3 illustrates an exemplary adopting method for the RTK positioning result and the indoor positioning result. Indoor positioning result A21 represented by a black circle in FIG. 3 indicates an indoor positioning result calculated by the positioning terminal from the indoor signals of signal generators 12a and 12b.

Indoor positioning error A22 represented by a dotted circle in FIG. 3 indicates an error of the indoor positioning result. Indoor positioning error A22 is a predetermined value and varies depending on, for example, the scheme to be applied to the indoor positioning, the standard, or the performance of signal generators 12a and 12b. In the example of FIG. 3, indoor positioning error A22 of indoor positioning result A21 is "d". Note that indoor positioning error A22 may be regarded as positioning accuracy of the indoor positioning.

RTK positioning results A23 and A24 represented by an open circle and a square in FIG. 3 indicate RTK positioning results (FIX solutions) calculated by the positioning terminal from the positioning signal from satellite 11.

Here, as described in the feature example of each positioning, a FIX solution is sometimes obtained by the RTK positioning in the vicinity of building A1, but a false FIX solution is possibly included. That is, a FIX solution can be obtained by the RTK positioning in area A13 illustrated in FIG. 2, but a false FIX solution is possibly included.

In this regard, when the RTK positioning result and the indoor positioning result can be obtained, the positioning terminal calculates distance "x" between the two positioning results and compares it with indoor positioning error "d". When calculated distance "x" is smaller than indoor positioning error "d" (x<d), the positioning terminal estimates (determines) that the RTK positioning result is unlikely to be a false FIX solution, and adopts the RTK positioning result. Meanwhile, when calculated distance "x" is equal to or larger than indoor positioning error "d" (x≥d), the positioning terminal estimates that the RTK positioning result is likely to be a false FIX solution, and adopts the indoor positioning result.

For example, it is assumed that the positioning terminal calculates indoor positioning result A21 and RTK positioning result A23 as illustrated in FIG. 3. The distance between indoor positioning result A21 and RTK positioning result A23 is x1 (x1<d), as illustrated in FIG. 3. In this case, the positioning terminal determines that the RTK positioning result is unlikely to be a false FIX solution, and adopts RTK positioning result A23 with higher positioning accuracy than indoor positioning result A21.

In contrast, for example, it is assumed that the positioning terminal calculates indoor positioning result A21 and RTK positioning result A24 as illustrated in FIG. 3. The distance between indoor positioning result A21 and RTK positioning result A24 is x2 (x2>d), as illustrated in FIG. 3. In this case, the positioning terminal determines that the RTK positioning result is likely to be a false FIX solution and adopts indoor positioning result A21.

As described in FIG. 2, when exceeding area A11 (or area A13) where the RTK positioning result can be obtained, the positioning terminal calculates the DR positioning result by performing the DR positioning based on the most recently adopted RTK positioning result (FIX solution) and a sensor signal. The positioning terminal adopts the calculated DR positioning result or the indoor positioning result, whichever is estimated to have higher positioning accuracy.

Figure 4:
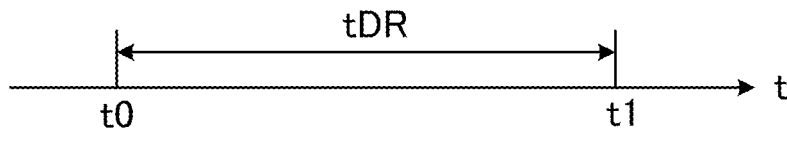
FIG. 4 illustrates an exemplary adopting method for a DR positioning result and an indoor positioning result.

FIG. 4 illustrates an exemplary adopting method for the DR positioning result and the indoor positioning result. Time t0 in FIG. 4 indicates the time at which the positioning terminal starts the DR positioning. Time t1 in FIG. 4 indicates the present time (e.g., the time at which the positioning terminal calculates the DR positioning result). Time "tDR" indicates the time from time "t0" at which the positioning terminal starts the DR positioning to the present time "t1".

Here, as described in the feature example of each positioning, errors are accumulated over time in terms of the DR positioning result.

In this regard, when the DR positioning result and the indoor positioning result are obtained, the positioning terminal calculates (estimates) the DR cumulative error in time "tDR", which is from the time at which the DR positioning is started to the present time, and compares it with indoor positioning error "d". When the calculated DR cumulative error is smaller than indoor positioning error "d", the positioning terminal estimates that the DR positioning result has less errors (higher positioning accuracy) than the indoor positioning result, and adopts the DR positioning result. Meanwhile, when the calculated DR cumulative error is equal to or larger than indoor positioning error "d", the positioning terminal estimates that the DR positioning result has more errors (lower positioning accuracy) than the indoor positioning result, and adopts the indoor positioning result.

For example, the amount of error per unit time in the DR cumulative error is "a". In the actual environment, the amount of error per unit time in the DR cumulative error is not a constant value, but it is assumed to be "a" for simplicity of explanation in the present embodiment. Note that, in the actual environment, the amount of error "a" per unit time can be estimated from a mean value of the past DR cumulative errors and characteristics of various sensors used for the DR positioning, for example. The positioning terminal calculates DR cumulative error "eDR" from the start of the DR positioning to the present time by multiplying the amount of error "a" by time "tDR" from the start of the DR positioning to the present time.

When calculated DR cumulative error "eDR" is smaller than indoor positioning error "d", the positioning terminal determines that the DR positioning result has less errors than the indoor positioning result, and adopts the DR positioning result. Meanwhile, when calculated DR cumulative error "eDR" is equal to or larger than indoor positioning error "d", the positioning terminal determines that the DR positioning result has more errors than the indoor positioning result, and adopts the indoor positioning result.

Note that the amount of error "a" per unit time in the DR cumulative error is obtained in advance from, for example, measurement errors of a sensor.

Figure 5:
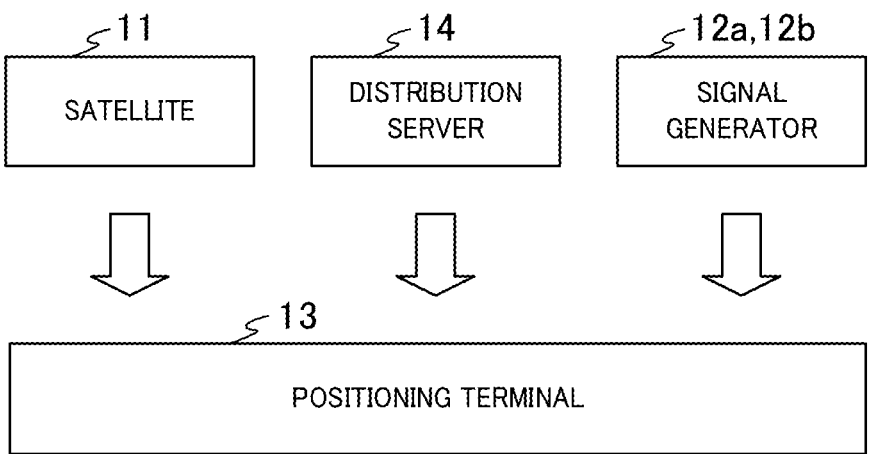
FIG. 5 illustrates exemplary signals received by a positioning terminal.

FIG. 5 illustrates exemplary signals received by positioning terminal 13 worn or carried by user U1. In FIG. 5, the same components as those in FIG. 1 are denoted by the same reference signs.

As illustrated in FIG. 5, positioning terminal 13 receives a positioning signal from satellite 11. In addition, positioning terminal 13 receives reference station data from distribution server 14.

Distribution server 14 is, for example, a server that performs a distribution service for the reference station data used in the RTK positioning. Positioning terminal 13 receives the reference station data from distribution server 14 via a radio network, such as a cellular radio network, and corrects a positioning signal from satellite 11 using the received reference station data. The reference station data may be referred to as correction data.

Distribution server 14 may, for example, distribute the reference station data at an electronic reference point in the vicinity of positioning terminal 13. Here, the electronic reference point is a reference station corresponding to the reference station data in a system including distribution server 14. The electronic reference point may be, for example, a reference station installed in reality or a virtual reference station whose position and correction data are inferred based on information obtained from a reference station installed in reality. That is, the reference station data distributed from distribution server 14 may be the reference station data corresponding to the position of the electronic reference point.

Distribution server 14 may be, for example, a server of a reference station data distribution service operated by a government agency or a company. The reference station data distributed by distribution server 14 may be generated using the position of a reference station surveyed by a distributor and a satellite signal received by the reference station. Various commercially available reference station data distribution services are known and will not be described in detail.

Positioning terminal 13 receives indoor signals from signal generators 12a and 12b. In a case where positioning terminal 13 performs positioning based on the WiFi standard, BLE standard, or WiGig standard, for example, the indoor signals transmitted by radio from signal generators 12a and 12b may be beacon signals. Positioning terminal 13 may perform positioning for positioning terminal 13 by the received strength of the beacon signals, the direction of arrival of the beacon signals, or three-point positioning using the beacon signals, for example.

In a case where positioning terminal 13 performs positioning based on IMES, for example, the indoor signals transmitted by radio from signal generators 12a and 12b may be signals based on a protocol similar to that of GNSS satellites. Positioning terminal 13 may perform positioning for positioning terminal 13 by, for example, reading position information including the latitude and longitude configured to signal generators 12a and 12b.

Figure 6:
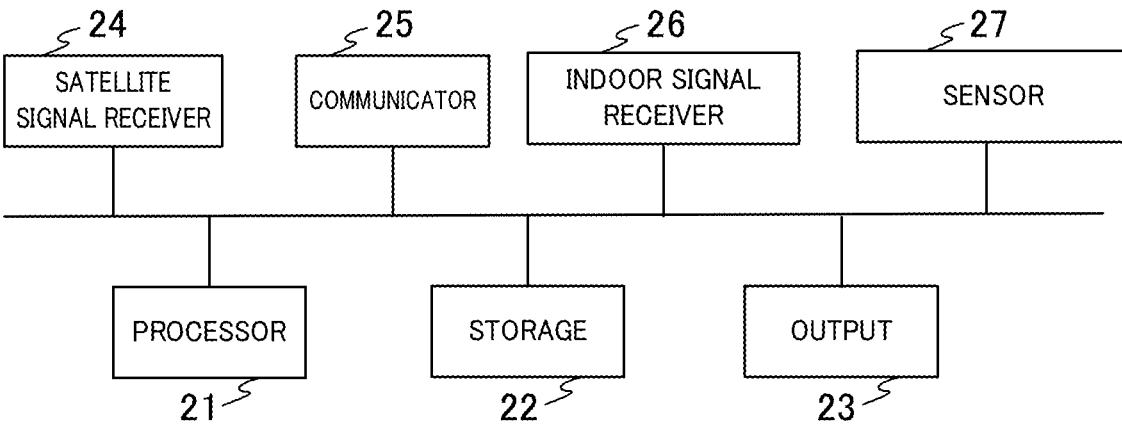
FIG. 6 illustrates an exemplary block configuration of the positioning terminal.

FIG. 6 illustrates an exemplary block configuration of positioning terminal 13. As illustrated in FIG. 6, positioning terminal 13 includes processor 21, storage 22, output 23, satellite signal receiver 24, communicator 25, indoor signal receiver 26, and sensor 27.

Processor 21 controls the entire positioning terminal 13. Processor 21 may be, for example, a processor such as a central processing unit (CPU) or digital signal processing (DSP).

Storage 22 stores programs for processor 21 to control respective components. Storage 22 also stores data for processor 21 to perform computing processing or data for processor 21 to control each component. Storage 22 may be a storage apparatus such as random access memory (RAM), read only memory (ROM), flash memory, and hard disk drive (HDD).

Output 23 outputs the data outputted from processor 21 to an output apparatus such as a display apparatus or external memory, for example. For example, output 23 outputs a positioning result calculated or adopted by processor 21 to the output apparatus such as a display apparatus or external memory, for example.

Satellite signal receiver 24 receives a positioning signal from satellite 11. Satellite signal receiver 24 demodulates the received positioning signal and outputs the signal to processor 21.

Communicator 25 communicates with distribution server 14 via a radio network, such as a cellular radio network, for example.

Indoor signal receiver 26 receives an indoor signal from signal generators 12a and 12b. Indoor signal receiver 26 demodulates the received indoor signal and outputs the signal to processor 21.

Sensor 27 is, for example, a sensor such as an acceleration sensor or a gyro sensor. Sensor 27 converts the measured physical quantity into an electrical signal and outputs the signal to processor 21.

Figure 7:
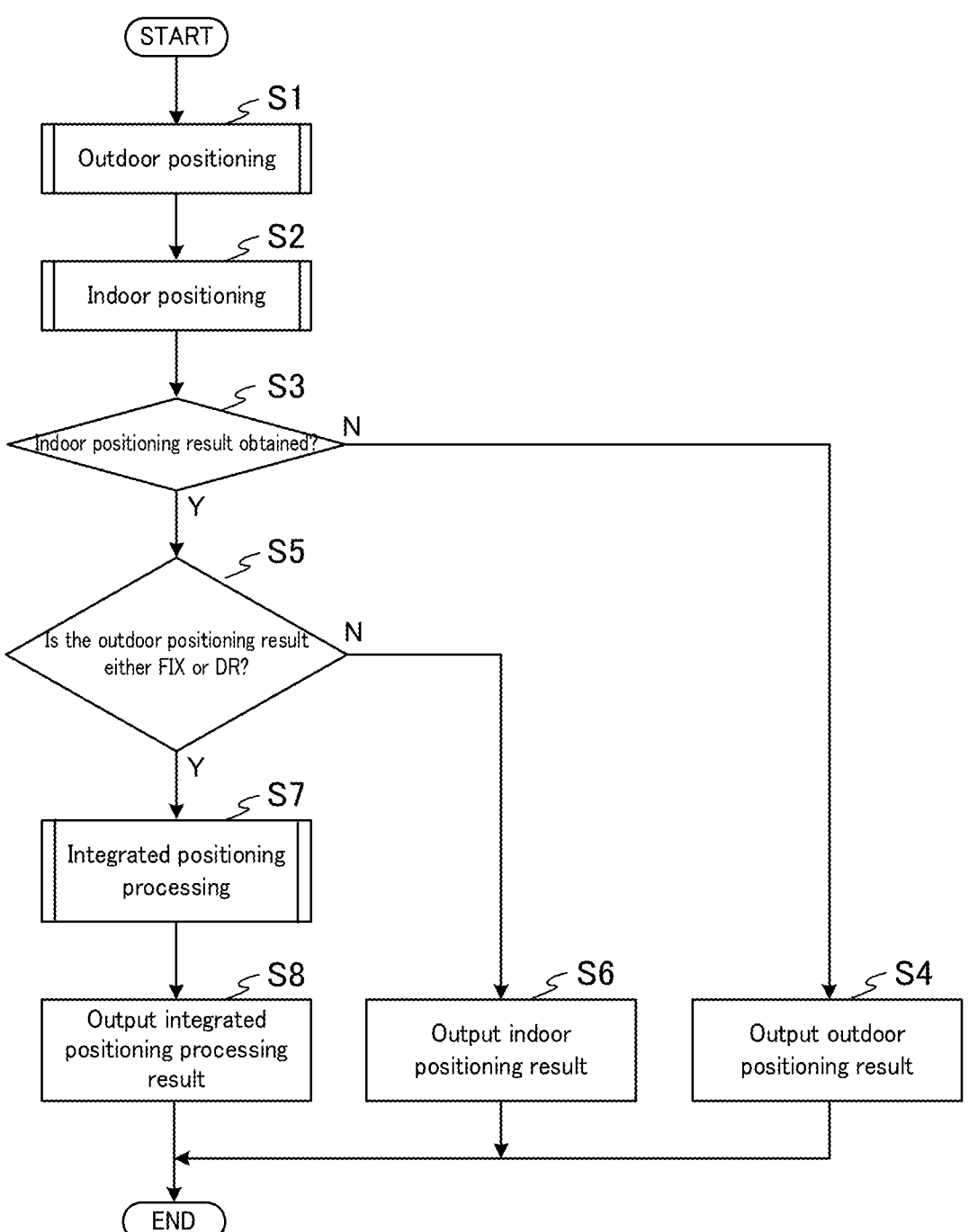
FIG. 7 is a flowchart describing an exemplary operation of the positioning terminal.

FIG. 7 is a flowchart describing an exemplary operation of positioning terminal 13. For example, positioning terminal 13 repeatedly performs the processing in the flowchart illustrated in FIG. 7 in a predetermined cycle.

Positioning terminal 13 performs outdoor positioning (S1). For example, positioning terminal 13 performs the RTK positioning using a positioning signal from satellite 11. In addition, positioning terminal 13 performs the DR positioning using the most recent RTK positioning result and a sensor signal from sensor 27.

Note that processing of the outdoor positioning by the RTK positioning will be described in detail with reference to the flowchart in FIG. 8. Also, processing of the outdoor positioning by the DR positioning will be described in detail with reference to the flowchart in FIG. 9.

Positioning terminal 13 performs indoor positioning (S2). For example, positioning terminal 13 performs the indoor positioning using the indoor signals from signal generators 12*a* and 12*b*. Note that processing of the indoor positioning will be described in detail with reference to the flowchart in FIG. 10.

Positioning terminal 13 determines whether the indoor positioning result has been obtained by the indoor positioning in S2 (S3).

When determining in S3 that no indoor positioning result has been obtained ("N" in S3), positioning terminal 13 outputs the outdoor positioning result (RTK positioning result) to an output apparatus (S4). Note that positioning terminal 13 determines that no indoor positioning result has been obtained when located outdoors where the indoor signals of signal generators 12*a* and 12*b* are out of reach, for example. Then, positioning terminal 13 outputs the RTK positioning result obtained outdoors, for example, to the output apparatus.

Positioning terminal 13 determines whether the outdoor positioning result obtained by the outdoor positioning in S1 is either the RTK positioning result (FIX solution) or the DR positioning result (S5).

When determining in S5 that the outdoor positioning result of either the RTK positioning result or the DR positioning result is not obtained ("N" in S5), positioning terminal 13 outputs the indoor positioning result obtained by the indoor positioning in S2 to the output apparatus (S6).

That is, when obtaining the indoor positioning result ("Y" in S3) and obtaining neither the RTK positioning result nor the DR positioning result ("N" in S5), positioning terminal 13 outputs the indoor positioning result obtained by the indoor positioning in S2 to the output apparatus. For example, when positioning terminal 13 is located inside of building A1 where the positioning signal of satellite 11 cannot be received and has ended the DR positioning, it determines that no outdoor positioning result is obtained and outputs the indoor positioning result obtained by the indoor positioning in S2 to the output apparatus.

When determining in S5 that the outdoor positioning result of either the RTK positioning result or the DR positioning result is obtained ("Y" in S5), positioning terminal 13 performs integrated positioning processing (S7).

That is, positioning terminal 13 performs integrated positioning processing when obtaining the indoor positioning result ("Y" in S3) and obtaining the outdoor positioning result of either the RTK positioning result or the DR positioning result ("Y" in S5).

Note that the integrated positioning processing is performed, for example, when the RTK positioning result is obtained in S1 and the indoor positioning result is obtained in S2. The RTK positioning result or the indoor positioning result, whichever is estimated to have higher positioning accuracy is adopted and outputted as an integrated positioning result.

In addition, the integrated positioning processing is performed, for example, when the DR positioning result is obtained in S1 and the indoor positioning result is obtained in S2. The DR positioning result or the indoor positioning result, whichever is estimated to have higher positioning accuracy is adopted and outputted as an integrated positioning result. The integrated positioning processing will be described in detail with reference to the flowchart in FIG. 11.

Positioning terminal 13 outputs the integrated positioning result generated by the integrated positioning processing in S7 to the output apparatus (S8).

Figure 8:
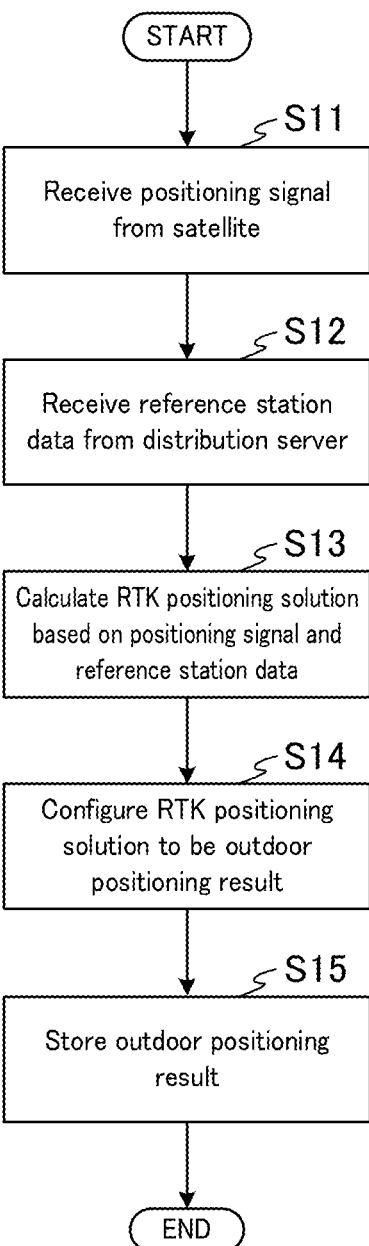
FIG. 8 is a flowchart describing an exemplary operation of the positioning terminal in outdoor positioning (RTK positioning)

FIG. 8 is a flowchart describing an exemplary operation of positioning terminal 13 in the outdoor positioning (RTK positioning). The flowchart illustrated in FIG. 8 describes an exemplary operation in S1 of FIG. 7 in detail.

Positioning terminal 13 receives a positioning signal from satellite 11 (S11).

Positioning terminal 13 receives reference station data from distribution server 14 (S12).

Positioning terminal 13 calculates an RTK positioning solution based on the positioning signal received in S11 and the reference station data received in S12 (S13). Positioning terminal 13 configures the RTK positioning solution (RTK positioning result) calculated in S13 to be the outdoor positioning result (S14). When the RTK positioning solution is not obtained in S13, positioning terminal 13 assumes that the outdoor positioning result has no solution.

Positioning terminal 13 stores the outdoor positioning result in S14 in storage 22 (S15).

Figure 9:
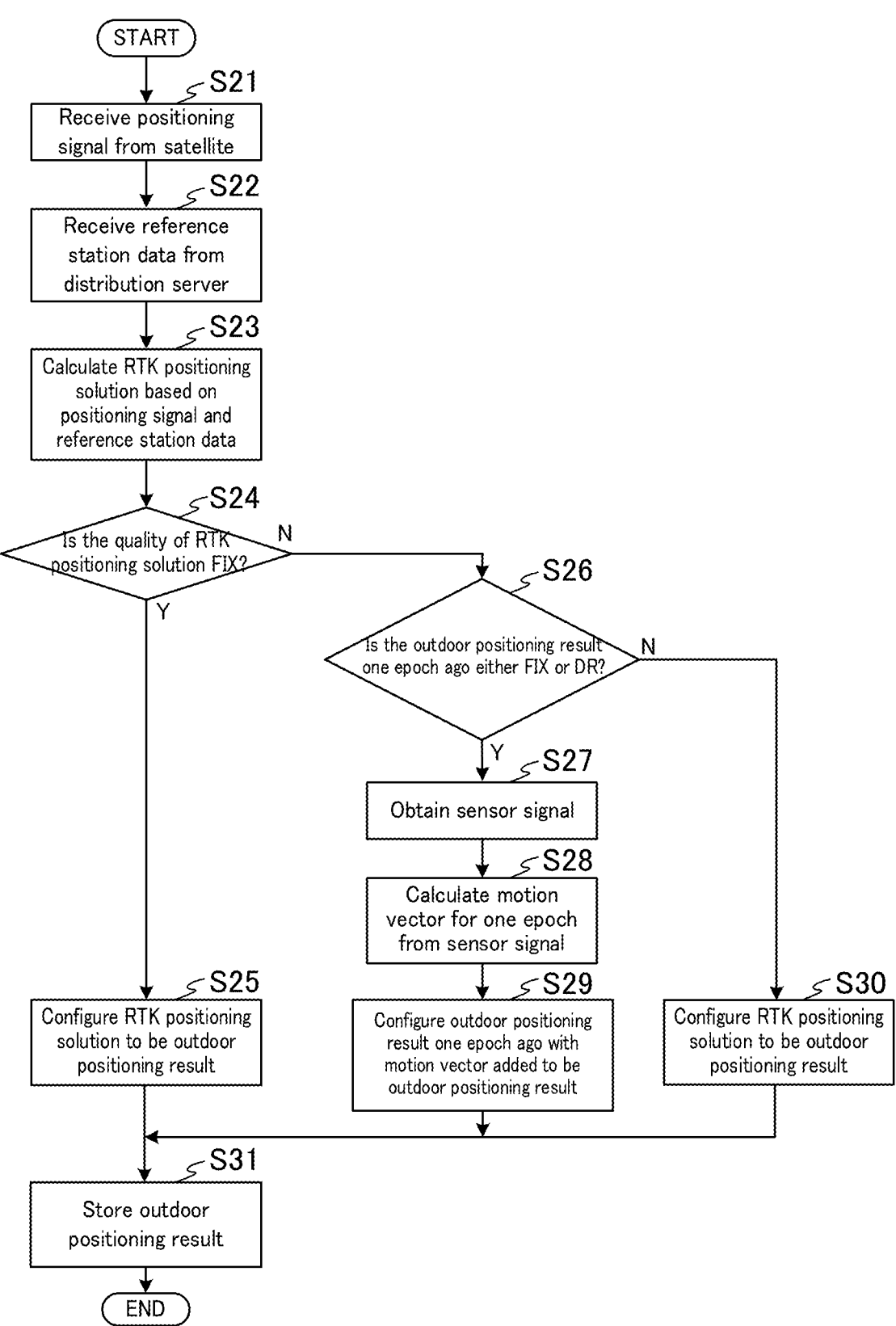
FIG. 9 is a flowchart describing an exemplary operation of the positioning terminal in outdoor positioning (DR positioning)

FIG. 9 is a flowchart describing an exemplary operation of positioning terminal 13 in the outdoor positioning (DR positioning). The flowchart illustrated in FIG. 9 describes an exemplary operation in S1 of FIG. 7 in detail. The processes in S21 to S23 of FIG. 9 are the same as the processes in S11 to S13 of FIG. 8, and the description thereof will be omitted.

Positioning terminal 13 determines whether the quality of the RTK positioning solution calculated in S23 is a FIX solution (S24).

When determining in S24 that the quality of the RTK positioning solution is a FIX solution ("Y" in S24), positioning terminal 13 configures the RTK positioning solution (RTK positioning result) determined as a FIX solution to be the outdoor positioning result (S25). When determining in S24 that the quality of the RTK positioning solution is not a FIX solution ("N" in S24), positioning terminal 13 determines whether the outdoor positioning result one epoch ago is either the RTK positioning result determined as a FIX solution or the DR positioning result (S26).

When determining in S26 that the outdoor positioning result one epoch ago is either the RTK positioning result determined as a FIX solution or the DR positioning result ("Y" in S26), positioning terminal 13 obtains a sensor signal from sensor 27 (S27).

Positioning terminal 13 calculates a moving vector for one epoch from the sensor signal obtained in S27 (S28).

Positioning terminal 13 adds the motion vector calculated in S28 to the outdoor positioning result one epoch ago, and configures the result (that is, DR positioning result) as the outdoor positioning result (S29).

When determining in S26 that the outdoor positioning result one epoch ago is neither the RTK positioning result determined as a FIX solution nor the DR positioning result ("N" in S26), positioning terminal 13 configures the RTK positioning solution that is a Float solution to be the outdoor positioning result (S30).

Positioning terminal 13 stores the outdoor positioning result obtained by the process in S25, S29, or S30 in storage 22 (S31).

Figure 10:
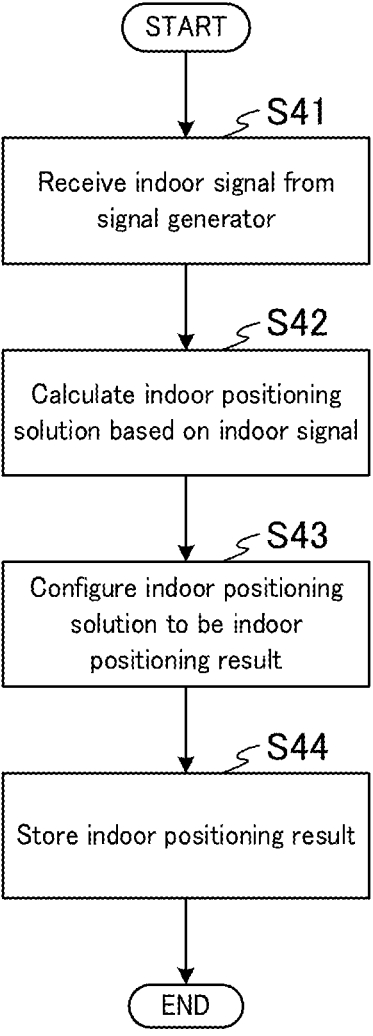
FIG. 10 is a flowchart describing an exemplary operation of the positioning terminal in indoor positioning.

FIG. 10 is a flowchart describing an exemplary operation of positioning terminal 13 in the indoor positioning. The flowchart illustrated in FIG. 10 describes an exemplary operation in S2 of FIG. 7 in detail.

Positioning terminal 13 receives indoor signals from signal generators 12*a* and 12*b* (S41).

Positioning terminal 13 calculates the indoor positioning solution based on the indoor signals received in S41 (S42).

Positioning terminal 13 configures the indoor positioning solution calculated in S42 to be the indoor positioning result (S43). When the indoor positioning solution is not obtained in S42, positioning terminal 13 assumes that the outdoor positioning result has no solution.

Positioning terminal 13 stores the outdoor positioning result in S43 in storage 22 (S44).

Figure 11:
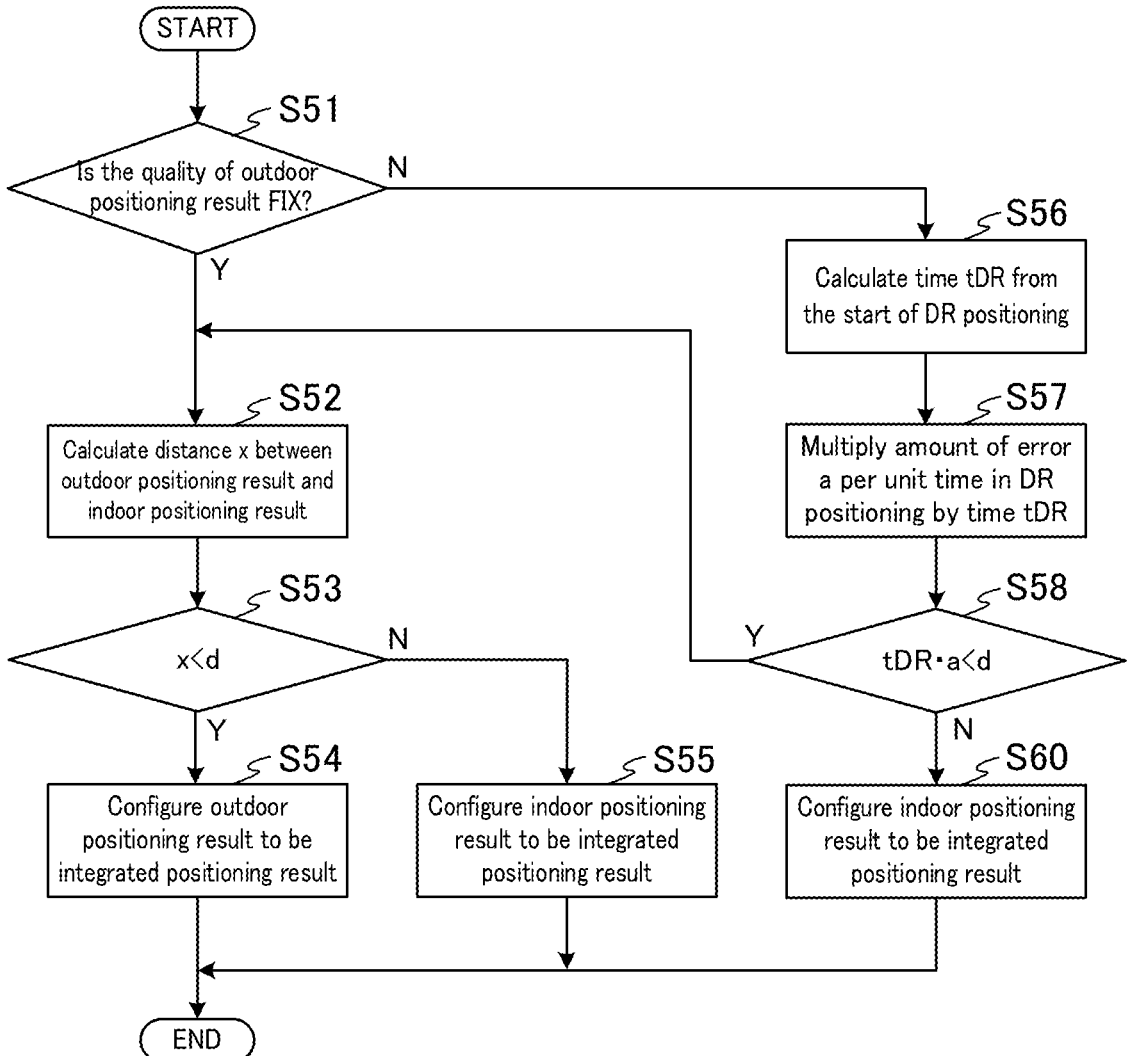
FIG. 11 is a flowchart illustrating an exemplary operation of integrated positioning processing by the positioning terminal.

FIG. 11 is a flowchart illustrating an exemplary operation of the integrated positioning processing by positioning terminal 13. The flowchart illustrated in FIG. 11 describes an exemplary operation in S7 of FIG. 7 in detail.

Positioning terminal 13 determines whether the quality of the outdoor positioning result obtained by the outdoor positioning in S1 of FIG. 7 is a FIX solution (RTK positioning result) (S51).

When determining in S51 that the quality of the outdoor positioning result obtained by the outdoor positioning is a FIX solution ("Y" in S51), positioning terminal 13 calculates distance "x" between the outdoor positioning result (FIX solution) obtained by the outdoor positioning and the indoor positioning result obtained by the indoor positioning in S2 (S52).

Positioning terminal 13 determines whether distance "x" calculated in S52 is smaller than indoor positioning error "d" (S53).

When determining in S53 that distance "x" is smaller than indoor positioning error "d" ("Y" in S53), positioning terminal 13 configures the outdoor positioning result (RTK positioning result as FIX solution) obtained in S1 of FIG. 7 to be the integrated positioning result (S54).

That is, unless the outdoor positioning result is far from the indoor positioning result by indoor positioning error "d" or more, positioning terminal 13 estimates that the outdoor positioning result is less likely to be a false FIX solution, and adopts the outdoor positioning result with higher positioning accuracy than the indoor positioning result.

When determining in S53 that distance "x" is not smaller than indoor positioning error "d" ("N" in S53), positioning terminal 13 configures the indoor positioning result obtained in S2 of FIG. 7 to be the integrated positioning result (S55).

That is, when the outdoor positioning result is far from the indoor positioning result by indoor positioning error "d" or more, positioning terminal 13 estimates that the outdoor positioning result is likely to be a false FIX solution, and adopts the indoor positioning result.

When determining in S51 that the quality of the outdoor positioning result obtained by the outdoor positioning is not a FIX solution ("N" in S51), positioning terminal 13 calculates time "tDR" from the start of the DR positioning to the present time (S56). That is, positioning terminal 13 calculates time "tDR" when determining that the outdoor positioning result obtained by the outdoor positioning in S1 of FIG. 7 is the DR positioning result.

Positioning terminal 13 multiplies time "tDR" calculated in S56 by the amount of error "a" per unit time in the DR positioning, and calculates DR cumulative error "tDR·a" in time "tDR" from the start of the DR positioning to the present (S57).

Positioning terminal 13 determines whether DR cumulative error "tDR·a" calculated in S57 is smaller than indoor positioning error "d" (S58).

When determining in S58 that DR cumulative error "tDR·a" is smaller than indoor positioning error "d" ("Y" in S58), positioning terminal 13 proceeds the processing to S52.

That is, unless the cumulative error of the outdoor positioning result (DR positioning result) is equal to or larger than indoor positioning error "d", positioning terminal 13 calculates distance "x" between the outdoor positioning result (DR positioning result) and the indoor positioning result obtained by the indoor positioning in S2 (S52). Then, positioning terminal 13 performs the processes of S53 to S54. This is because, in a case where the DR positioning is performed starting from a false FIX solution, a DR positioning result with large error is possibly obtained even when DR cumulative error "tDR·a" is smaller than indoor positioning error "d". Thus, in order to eliminate the DR positioning result starting from a false FIX solution, positioning terminal 13 proceeds the processing to S52 when determining in S58 that DR cumulative error "tDR·a" is smaller than indoor positioning error "d" ("Y" in S58).

When determining in S58 that DR cumulative error "tDR·a" is not smaller than indoor positioning error "d" ("N" in S58), positioning terminal 13 configures the indoor positioning result obtained in S2 of FIG. 7 to be the integrated positioning result (S60).

That is, when the cumulative error of the outdoor positioning result (DR positioning result) is equal to or larger than indoor positioning error "d", positioning terminal 13 estimates that the positioning accuracy of the outdoor positioning result is lower than the positioning accuracy of the indoor positioning result, and adopts the indoor positioning result.

As described above, satellite signal receiver 24 of positioning terminal 13 receives a positioning signal (first signal) from satellite 11. Indoor signal receiver 26 receives indoor signals (second signals) from signal generators 12a and 12b. Processor 21 outputs either an RTK positioning result obtained from the positioning signal or an indoor positioning result obtained from the indoor signals based on a result of comparing the distance between the RTK positioning result and the indoor positioning result with the positioning accuracy (indoor positioning error) of the indoor positioning result. This allows positioning terminal 13 to prevent a decrease in the positioning accuracy at the border between the outside and inside of building A1.

For example, even when the indoor positioning result is obtained from the indoor signals of signal generators 12a and 12b at the border between the outside and inside of building A1, positioning terminal 13 does not immediately adopt the indoor positioning result. In a case where the RTK positioning result is obtained from the positioning signal of satellite 11 at the border between the outside and inside of building A1 and the distance between the RTK positioning result and the indoor positioning result is smaller than the indoor positioning error in the indoor positioning, positioning terminal 13 outputs the RTK positioning result with higher positioning accuracy than the indoor positioning result. This allows positioning terminal 13 to prevent a decrease in the positioning accuracy at the border between the outside and inside of building A1.

Note that, in this configuration, there is a risk that a false FIX solution is outputted when the distance between the false FIX solution and the indoor positioning result happens to be smaller than the indoor positioning error. The indoor positioning, however, can only guarantee that positioning terminal 13 exists within the range of the indoor positioning error; accordingly, the positioning accuracy is not degraded even if the false FIX solution is outputted compared to the case of outputting the indoor positioning result. In addition, when a correct FIX solution is outputted, it is possible to output a position with higher accuracy than that in the indoor positioning since the accuracy of a correct FIX solution is higher than the accuracy of the indoor positioning. Thus, this configuration makes it possible, regardless of whether the RTK positioning result is a false FIX solution, to output a positioning result with higher accuracy than in a configuration of simply switching to the indoor positioning result as soon as the indoor positioning result is obtained.

In addition, when the indoor positioning result is obtained and the RTK positioning result is no longer obtained, processor 21 of positioning terminal 13 outputs either a DR positioning result obtained from the most recent RTK positioning result and a sensor signal or the indoor positioning result based on the result of comparing a DR cumulative error of the DR positioning result with the indoor positioning error in the indoor positioning. This allows positioning terminal 13 to prevent a decrease in the positioning accuracy at the border between the outside and inside of building A1.

For example, positioning terminal 13 does not immediately adopts the indoor positioning result when the indoor positioning result is obtained and the RTK positioning result is no longer obtained. In a case where the DR positioning result is obtained from the most recent RTK positioning result and a sensor signal, when the DR cumulative error of the DR positioning result is smaller than the indoor positioning error in the indoor positioning, and the distance between the DR positioning result and the indoor positioning result is smaller than the indoor positioning error in the indoor positioning, positioning terminal 13 outputs the DR positioning result with higher positioning accuracy than the indoor positioning result. This allows positioning terminal 13 to prevent a decrease in the positioning accuracy at the border between the outside and inside of building A1 while reducing the possibility of outputting the DR positioning result starting from a false FIX solution.

Note that, in this configuration, even the DR positioning result starting from a false FIX solution may happen to meet a condition for the output of the DR positioning result. The indoor positioning, however, can only guarantee that positioning terminal 13 exists within the range of the indoor positioning error; accordingly, the positioning accuracy is not degraded compared to the case of outputting the indoor positioning result even if the DR positioning result starting from a false FIX solution is outputted. With sufficiently small DR cumulative error, the accuracy of the DR positioning solution starting from a correct FIX solution is higher than the accuracy of the indoor positioning, so that it is possible to output a position with higher accuracy than that in the indoor positioning when the DR positioning solution starting from a correct FIX solution is outputted. Thus, this configuration makes it possible, regardless of whether the DR positioning result starts from a false FIX solution, to output a positioning result with higher accuracy than in a configuration of simply switching to the indoor positioning result as soon as the indoor positioning result is obtained.

Further, in the above description, the DR cumulative error being smaller than the indoor positioning error in the indoor positioning is a condition for the determination whether the distance between the DR positioning result and the indoor positioning result is smaller than the indoor positioning error in the indoor positioning. According to this configuration, when the DR cumulative error is sufficiently large and the DR positioning result is not very reliable regardless of whether the starting point of the DR positioning is a false FIX solution, it can be determined not to adopt the DR positioning result without determining whether it is smaller than the indoor positioning error in the indoor positioning.

Although the indoor positioning error is used as a comparison target with the DR cumulative error in the above description, a value smaller than the indoor positioning error may be used as the comparison target. This reduces the possibility of outputting the DR positioning result in which the actual DR cumulative error is larger than the calculated DR cumulative error, for example, when the actual measurement of the DR cumulative error tends to vary.

Alternatively, a value larger than the indoor positioning error may be used as the comparison target with the DR cumulative error. This makes it possible to output the DR positioning result even when the position deviation due to a false FIX solution and the position deviation due to the DR cumulative error are accidentally offset. Further, it is also possible to eliminate the comparison between the DR cumulative error and the indoor positioning error and always determine whether the difference between the DR positioning result and the indoor positioning result is smaller than the indoor positioning error. This has an effect of eliminating the calculation of the DR cumulative error, in addition to the effect obtained by using a value larger than the indoor positioning error as the comparison target with the DR cumulative error.

(Variation 1)

In the above embodiment, positioning terminal 13 compares the DR cumulative error of the DR positioning result with the indoor positioning error in the indoor positioning, and outputs either the DR positioning result or the indoor positioning result (e.g., see S58 to S60 in FIG. 11), but the present disclosure is not limited thereto. For example, positioning terminal 13 may output the DR positioning until the DR cumulative error exceeds the indoor positioning error in the indoor positioning.

Time (DR output time) until the DR cumulative error exceeds the indoor positioning error of the indoor positioning may be calculated in advance and configured to positioning terminal 13. The DR output time is obtained, for example, by dividing the indoor positioning error "d" of the indoor positioning by the amount of error "a" per unit time of the DR positioning. When the indoor positioning result is obtained and the RTK positioning result is no longer obtained, positioning terminal 13 starts the DR positioning and outputs the DR positioning result until the DR output time elapses. Positioning terminal 13 outputs the indoor positioning result when the DR output time elapses.

(Variation 2)

In the above embodiment, positioning terminal 13 performs positioning for positioning terminal 13, but the present disclosure is not limited thereto. An operation server may perform positioning for positioning terminal 13.

Figure 12:
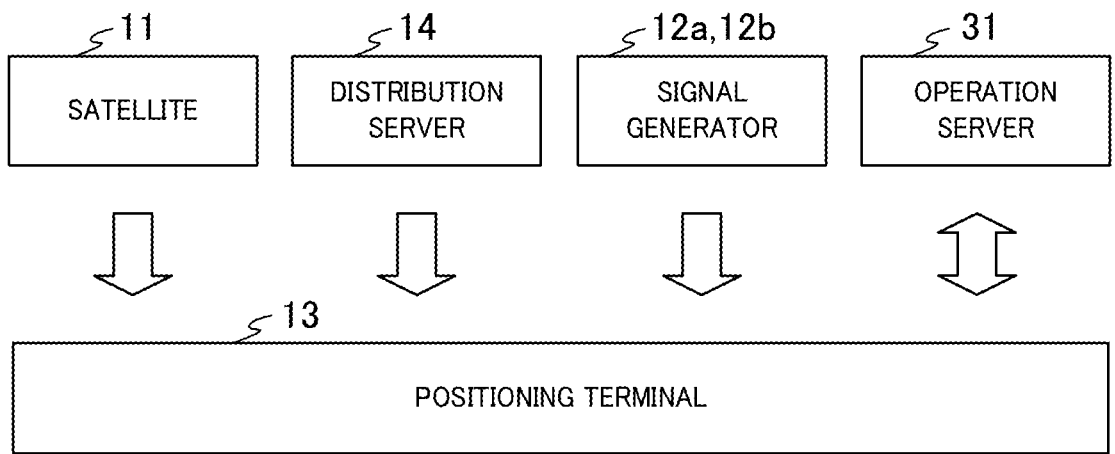
FIG. 12 illustrates exemplary signals communicated by a positioning terminal.

FIG. 12 illustrates exemplary signals communicated by positioning terminal 13. In FIG. 12, the same components as those in FIG. 5 are denoted by the same reference signs. FIG. 12 illustrates operation server 31 that perform positioning for positioning terminal 13.

Positioning terminal 13 transmits a positioning signal received from satellite 11, reference station data received from distribution server 14, and indoor signals received from signal generators 12a and 12b to operation server 31. Positioning terminal 13 also transmits a sensor signal received from sensor 27 to operation server 31.

Operation server 31 performs positioning for positioning terminal 13 based on the signals received from positioning terminal 13. Operation server 31 performs the same processing as positioning terminal 13 described above, and performs positioning for positioning terminal 13. Operation server 31 transmits the positioning result to positioning terminal 13.

Figure 13:
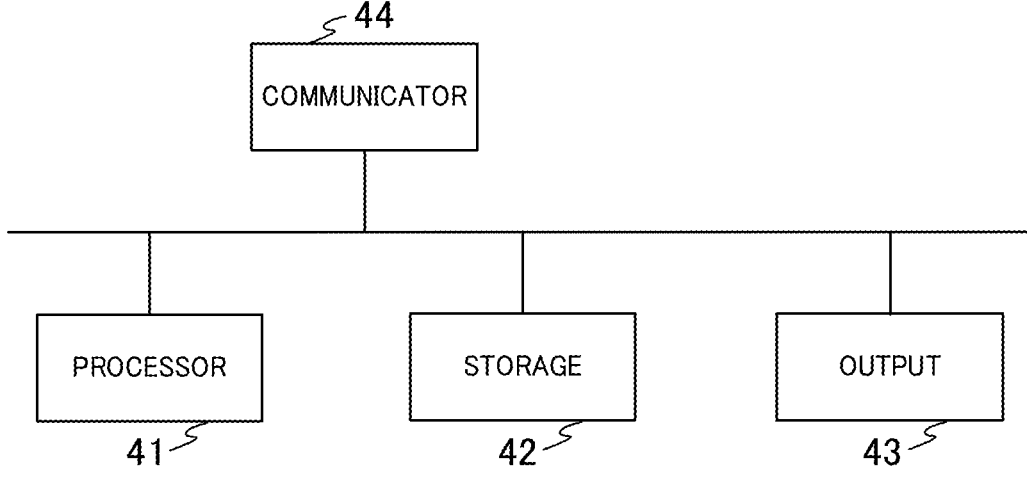
FIG. 13 illustrates an exemplary block configuration of an operation server.

FIG. 13 illustrates an exemplary block configuration of operation server 31. As illustrated in FIG. 13, operation server 31 includes processor 41, storage 42, output 43, and communicator 44.

Processor 41 controls the entire operation server 31. Processor 41 may be, for example, a processor such as a CPU or DSP.

Storage 42 stores programs for processor 41 to control respective components. Storage 42 also stores data for processor 41 to perform computing processing or data for processor 41 to control each component. Storage 42 may be a storage apparatus such as RAM, ROM, flash memory, and HDD.

Output 43 outputs the data outputted from processor 41 to an output apparatus such as a display apparatus, for example. For example, output 43 outputs a positioning result calculated or adopted by processor 41 to the output apparatus such as a display apparatus, for example.

Communicator 44 communicates with positioning terminal 13 via a radio network, such as a cellular radio network, for example. Communicator 44 receives various types of information transmitted from positioning terminal 13. Further, communicator 44 transmits, to positioning terminal 13, a result of positioning for positioning terminal 13 calculated or adopted by processor 41.

Since the positioning processing by operation server 31 is the same as the processing by positioning terminal 13, the detailed description thereof will be omitted.

(Variation 3)

When positioning terminal 13 moves from the inside to the outside of building A1, the RTK positioning result may be adopted when the RTK positioning result (FIX solution) continues for a predetermined number of epochs. Since the RTK positioning is more accurate than the indoor positioning, when it can be estimated that the RTK positioning result is unlikely to be a false FIX solution, it is not worthwhile to adopt the indoor positioning result. Note that a false FIX solution is generated only when signal reflection by a wall, etc. meets a special condition. Thus, when the condition is not met even slightly, it is likely that the RTK positioning becomes less reliable and only Float solution is obtained. In this regard, it is confirmed in this Variation that a false FIX solution is less likely to be generated by confirming that the RTK positioning result (FIX solution) continues for a predetermined number of epochs.

Note that the RTK positioning result is possibly a false FIX solution before the RTK positioning result (FIX solution) continues for a predetermined number of epochs. Thus, before the RTK positioning result (FIX solution) continues for a predetermined number of epochs, the indoor positioning result may be adopted, or which result to output may be determined based on the comparison of the difference between the RTK positioning result and the indoor positioning result with the indoor positioning error as in the above embodiment.

(Variation 4)

Signal generators 12a and 12b are not limited to be installed in building A1. Signal generators 12a and 12b may be installed in a structure such as a tunnel or a utility pole, for example.

(Variation 5)

In the above embodiment, the RTK, which is a type of interference positioning method, has been described as a positioning method using correction data, but it may be applied to other positioning methods using correction data from an apparatus corresponding to a reference station. To be more specific, the present disclosure can be applied to an interference positioning method other than the RTK, D-GPS, and the like. Although the content of the correction data may differ depending on the positioning method, as long as the correction data uses a satellite signal received by a reference station, it is common that the reception quality of the satellite signal needs to be ensured in order to implement accurate positioning. Thus, applying the configuration of the above embodiment makes it possible to easily install a reference station in such positioning methods, and to stabilize the positioning quality after installation of a reference station.

Although various embodiments have been described above with reference to the drawings, (it goes without saying that) the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

In the embodiments described above, " . . . er (or)" and "section" used for each component may be replaced with other terms such as " . . . circuit (circuitry)", " . . . assembly", " . . . device", " . . . unit" and " . . . module".

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

INDUSTRIAL APPLICABILITY

The present disclosure is useful for a positioning system in which a position is calculated using a signal from a satellite and an indoor signal from a signal generator installed in a structure.

The disclosure of Japanese Patent Application No. 2021-026241, filed on Feb. 22, 2021, including the specification, drawings and abstract, is incorporated herein by reference in its entirety.

REFERENCE SIGNS LIST

1 Positioning system
11 Satellite
12a, 12b Signal generator
13 Positioning terminal
14 Distribution server
21 Processor
22 Storage
23 Output
24 Satellite signal receiver
25 Communicator
26 Indoor signal receiver
27 Sensor
31 Operation server
A1 Building
U1 User
A11 to A13 Area
A21 Indoor positioning result
A22 Indoor positioning error
A23, A24 RTK positioning result

The invention claimed is:

1. A positioning terminal, comprising:
a receiver, which in operation, receives a satellite signal from a satellite and an indoor signal from a signal generator installed in a structure; and
a controller, which in operation, calculates a distance between a first position of the positioning terminal obtained at a first time and a second position of the positioning terminal obtained at the first time, the first position being obtained from the satellite signal and the second position being obtained from the indoor signal without using the satellite signal, and switches between outputting the first position of the positioning terminal obtained from the satellite signal at the first time and the second position of the positioning terminal obtained from the indoor signal without using the satellite signal at the first time, based on a result of comparing the distance between the first position and the second position with a positioning accuracy of the second position,
wherein the controller switches to outputting the first position when the distance between the first position and the second position is less than the positioning accuracy.

2. The positioning terminal according to claim 1, wherein,
the controller determines whether a first position is obtained from a satellite signal at a second time after the first time and determines whether a second position is obtained from an indoor signal at the second time, and
when the second position is obtained at the second time and the first position is not obtained at the second time, the controller switches between outputting a third position of the positioning terminal and the second position obtained at the second time, based on a result of comparing a cumulative error of the third position and the positioning accuracy, the third position of the positioning terminal being obtained based on the first position obtained most recently before the second time and a sensor signal.

3. The positioning terminal according to claim 2, wherein the controller switches to outputting the third position when the cumulative error is less than the positioning accuracy.

4. The positioning terminal according to claim 1, wherein, the controller determines whether a first position is obtained from a satellite signal at a second time after obtained from a satellite signal at a second time after the first time and determines whether a second position is obtained from an indoor signal at the second time, and
when the second position is obtained at the second time and the first position is not obtained at the second time, the controller outputs a third position of the positioning terminal until a predetermined time elapses, the third position of the positioning terminal being obtained based on the first position obtained most recently before the second time and a sensor signal.

5. The positioning terminal according to claim 4, wherein the predetermined time is determined based on the positioning accuracy and an amount of error per unit time of the third position.

6. The positioning terminal according to claim 1, wherein the controller switches to outputting the second position of the positioning terminal when the distance between the first position and the second position is more than the positioning accuracy.

7. The positioning terminal according to claim 3, wherein the controller switches to outputting the second position obtained at the second time when the cumulative error is more than the positioning accuracy.

8. The positioning terminal according to claim 1, wherein the controller calculates the first position from the satellite signal at the first time, calculates the second position from the indoor signal without using the satellite signal at the first time, and calculates the distance between the first position calculated at the first time and the second position calculated at the first time.

9. A positioning method, comprising:
receiving a satellite signal from a satellite and an indoor signal from a signal generator installed in a structure;
calculating a distance between a first position of a positioning terminal obtained at a first time and a second position of the positioning terminal obtained at the first time, the first position being obtained from the satellite signal and the second position being obtained from the indoor signal without using the satellite signal; and
switching between outputting of the first position of the positioning terminal obtained from the satellite signal at the first time and the second position of the positioning terminal obtained from the indoor signal without using the satellite signal at the first time, based on a result of comparing the distance between the first position and the second position with a positioning accuracy of the second position,
wherein the first position is output when the distance between the first position and the second position is less than the positioning accuracy.

10. An information processing device which communicates with a terminal that receives a satellite signal from a satellite and an indoor signal from a signal generator installed in a structure, the information processing device comprising:
a receiver, which in operation, receives a first signal associated with the satellite signal and a second signal associated with the indoor signal from the terminal;
a processor, which in operation, calculates a distance between a first position of the terminal obtained at a first time and a second position of the terminal obtained at the first time, the first position being obtained from the first signal associated with the satellite signal and the second position being obtained from the second signal associated with the indoor signal without using the first signal, and a transmitter, which in operation, switches between transmitting, to the terminal, the first position of the terminal obtained from the first signal associated with the satellite signal at the first time and the second position of the terminal obtained from the second signal associated with the indoor signal without using the first signal at the first time, based on a result of comparing the distance between the first position and the second position with a positioning accuracy of the second position, wherein the transmitter switches to transmitting the first position when the distance between the first position and the second position is less than the positioning accuracy of the second position.

11. A positioning method performed by an information processing device which communicates with a terminal that receives a satellite signal from a satellite and an indoor signal from a signal generator installed in a structure, the method comprising:

receiving a first signal associated with the satellite signal and a second signal associated with the indoor signal from the terminal;

calculating a distance between a first position of the terminal obtained at a first time and a second position of the terminal obtained at the first time, the first position being obtained from the first signal associated with the satellite signal and the second position being obtained from the second signal associated with the indoor signal without using the first signal; and switching between transmitting, to the terminal, the first position of the terminal obtained from the first signal associated with the satellite signal at the first time and the second position of the terminal obtained from the second signal associated with the indoor signal without using the first signal at the first time, based on a result of comparing the distance between the first position and the second position with a positioning accuracy of the second position, wherein the first position is transmitted to the terminal when the distance between the first position and the second position is less than the positioning accuracy of the second position.

* * * * *